Dec. 15, 1931. H. C. BRILL 1,836,306
BAKE PAN
Filed Dec. 2, 1929
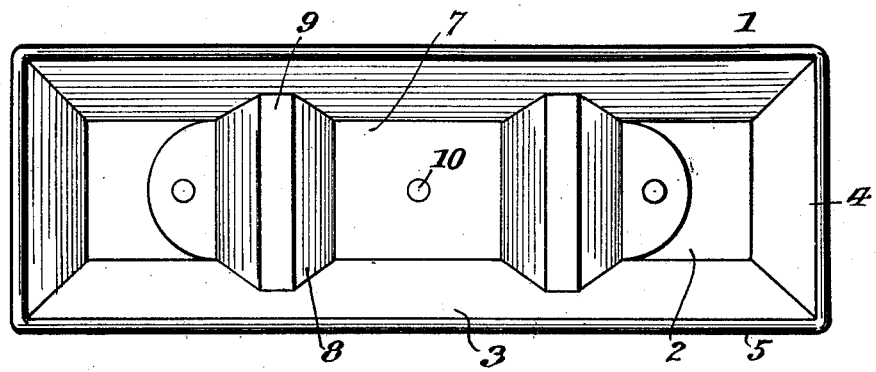
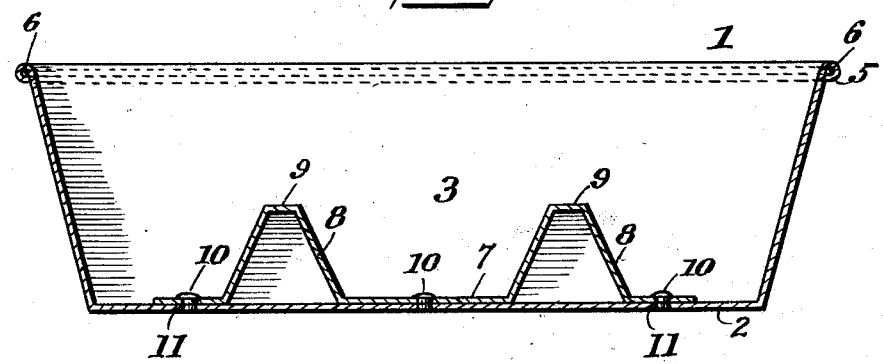
Inventor
Harry C. Brill
By Jacobi & Jacobi
Attorneys Patented Dec. 15, 1931

1,836,306

UNITED STATES PATENT OFFICE

HARRY C. BRILL, OF NEWARK, NEW JERSEY

BAKE PAN

Application filed December 2, 1929. Serial No. 411,054.

The present invention relates to improvements in bake pans and has for its principal object to provide a structure wherein a series of cakes or the like may be baked at one time and in such a manner as to cause the several cakes to be interconnected yet permitting the same to be readily and easily separated from each other when ready for distribution or use.

One of the important objects of the present invention resides in the provision of a bake pan which includes a removable false bottom, the removable false bottom being associated with the bake pan in such a manner as to permit the removal of the false bottom and the baked cakes from the pan with ease and without damaging the cakes, said false bottom serving as a cooling shelf for the cakes after the same have been removed from the bake pan.

A further and important object resides in the provision of a bake pan, of the above mentioned character wherein the removable false bottom includes a corrugated member so constructed as to form individual cakes of uniform size, the corrugations providing air spaces which eliminate over-cooking or burning of the cakes within the bake pan.

A still further object is to provide a bake pan of the above mentioned character wherein the parts are readily and easily assembled or disassembled for cleaning purposes, the same being further simple in construction, inexpensive, strong and durable and further well adapted for the purposes for which they are designed.

Other objects and advantages of the invention will become apparent during the course of the following description, taken in connection with the accompanying drawings.

In the accompanying drawings, wherein like reference characters designate like parts throughout the several views, Figure 1 represents a top plan view of my improved bake pan showing the corrugated false bottom arranged therein, and Figure 2 is a longitudinal sectional view through the bake pan and the removable false bottom unit.

In the drawings wherein for the purpose of illustration is shown a preferred embodiment of my invention, the numeral 1 designates generally my improved bake pan, the same being constructed of any suitable metal. This bake pan includes a rectangular shaped flat bottom 2 from which extends upwardly in diverging relation, the opposed side walls 3 as well as the end walls 4. The adjacent edges of the upstanding side and end walls may be connected together in any suitable manner and the upper edges of the side walls and end walls are rolled as shown at 5 and if desired, a reinforcing wire 6 is confined within the rolled upper edges of said side and end walls for further strengthening the bake pan.

Forming a salient part of the present invention is the removable false bottom unit designated generally by the numeral 7. This false bottom unit is formed of a single strip of sheet metal which is of such size as to fit within the bake pan 1 and the manner in which this unit is detachably associated with the bottom of the bake pan will be presently described in detail. The false bottom 7 is preferably corrugated and to this end, the strip of meal is bent to form the substantially inverted V-shaped ridges 8, the apex portions of which are flat as shown at 9 in the drawings.

These inverted V-shaped ridges are such height as to extend slightly below the center of the bake pan when the removable false bottom unit 7 is positioned within said bake pan and furthermore, the free edges of these ridges are disposed at an inclined or in converging relation with respect to the base of the false bottom unit so that the same will frictionally engage with the inclined side walls 3 of a bake pan.

As heretofore stated, the removable false bottom unit 7 is detachably secured in the bake pan and to this end, headed fastening elements 10 are carried by the end and intermediate flat portions of the false bottom unit 7 for disposition within suitable openings 11 provided therefor in the bottom 2 of the pan 1.

As is clearly shown in the drawings, the headed fastening elements cooperate with the openings 11 to maintain the false bottom unit within the bake pan against casual displacement therefrom and by exerting a slight pressure on the lower projecting end of the fastening elements, the false bottom unit 7 can be easily and readily removed from the bake pan together with the baked cakes, the unit 7 serving as a cooling shelf for the baked products after the same have been removed from the bake pan 1.

The flat apex portions 9 will provide a means whereby the cakes will be interconnected with each other in such a manner as to keep the series of cakes impact until the same are ready for use or distribution whereupon the cakes can be readily and easily separated from each other.

The provision of a false bottom unit for association with a bake pan in the manner as described above will permit a plurality of cakes to be baked at one side, the same being of uniform size and if desired, false bottom units of different sizes may be provided for forming cakes of different sizes.

The provision of inverted V-shaped ridges will provide a vacuum or air space which will eliminate over-cooking or burning of the cakes within the several compartments formed in the bake pan by reason of the ridges and the upstanding walls of the pan. Furthermore said false bottom units will permit the sanitary handling of the baked cakes in dispensing of same into suitable containers for shipping purposes.

The simplicity of my construction enables the parts to be readily and easily assembled or disassembled for cleaning purposes, and furthermore, my improved bake pans will at all times be positive and efficient in carrying out the purposes for which they are designed.

While I have shown a preferred embodiment of my invention, it is to be understood that various changes in the size, shape and arrangement of parts may be resorted to without departing from the spirit of the invention and the scope of the appended claims.

Having thus described my invention, what I claim as new is:

1. In a bake pan, an open top receptacle, a false bottom unit for disposition within the receptacle constructed, from a single strip of metal adapted to be disposed upon the upper face of the bottom of the receptacle, said strip of metal being bent to form a spaced transversely disposed upstanding ridges as and for the purposes described.

2. In a bake pan, an open top receptacle, a false bottom unit for disposition within the receptacle constructed from a single strip of metal adapted to be disposed upon the upper face of the bottom of the receptacle, said strip of metal being bent to form spaced transversely disposed upstanding ridges as and for the purposes described, and coacting means between the strip and the bottom of the receptacle for removably securing the false bottom unit in the receptacle.

In testimony whereof I affix my signature.

HARRY C. BRILL.